(12) United States Patent
Smoot

(10) Patent No.: US 6,367,714 B1
(45) Date of Patent: Apr. 9, 2002

(54) WEED STICK SPRAY

(75) Inventor: Jerry Smoot, Olton, TX (US)

(73) Assignee: Jerry W. Smoot, Olton, TX (US)

( * ) Notice: Subject to any disclaimer, the term of this patent is extended or adjusted under 35 U.S.C. 154(b) by 0 days.

(21) Appl. No.: 09/579,617

(22) Filed: May 26, 2000

(51) Int. Cl.[7] .................................................. B05B 1/28
(52) U.S. Cl. ..................... 239/288.5; 239/288; 239/321; 239/331; 239/499; 239/526; 239/583; 47/1.5; 47/48.5
(58) Field of Search ............................ 239/1, 271, 288, 239/288.3, 288.5, 320, 321, 329, 331, 333, 499, 525, 526, 532, 583; 47/1.5, 48.5; 111/7.1, 7.2, 7.3, 127; 222/383.1, 174

(56) References Cited

U.S. PATENT DOCUMENTS

| | | | | |
|---|---|---|---|---|
| 1,407,689 A | * | 2/1922 | Batterson | 239/329 X |
| 1,668,156 A | * | 5/1928 | Kitterman | 239/331 X |
| 1,865,914 A | | 7/1932 | Jaden | 47/1.5 |
| 2,817,189 A | | 12/1957 | Esmay | 47/1.5 |
| 2,821,048 A | | 1/1958 | Efford et al. | 47/1.5 |
| 2,841,923 A | | 7/1958 | Dickison | 47/1.5 |
| 2,880,939 A | * | 4/1959 | Esmay | 239/320 X |
| 3,346,194 A | * | 10/1967 | Enblom | 47/1.5 |
| 4,872,411 A | * | 10/1989 | Nagy | 239/271 X |

\* cited by examiner

Primary Examiner—Steven J. Ganey
(74) Attorney, Agent, or Firm—Wendell Coffee

(57) ABSTRACT

A herbicide applicator is in the form of an extended tube with a bell on the bottom to restrict the spray of herbicides. The tube includes a pump at the bottom which is connected to a nozzle within the bell. The pump is operated by a rod extending to the top of the tube. The rod is spring biased in a down position. The pump is operated by lifting the rod at the top and releasing the rod. The spring in the pump forces a measured amount of herbicide upon the release.

3 Claims, 1 Drawing Sheet

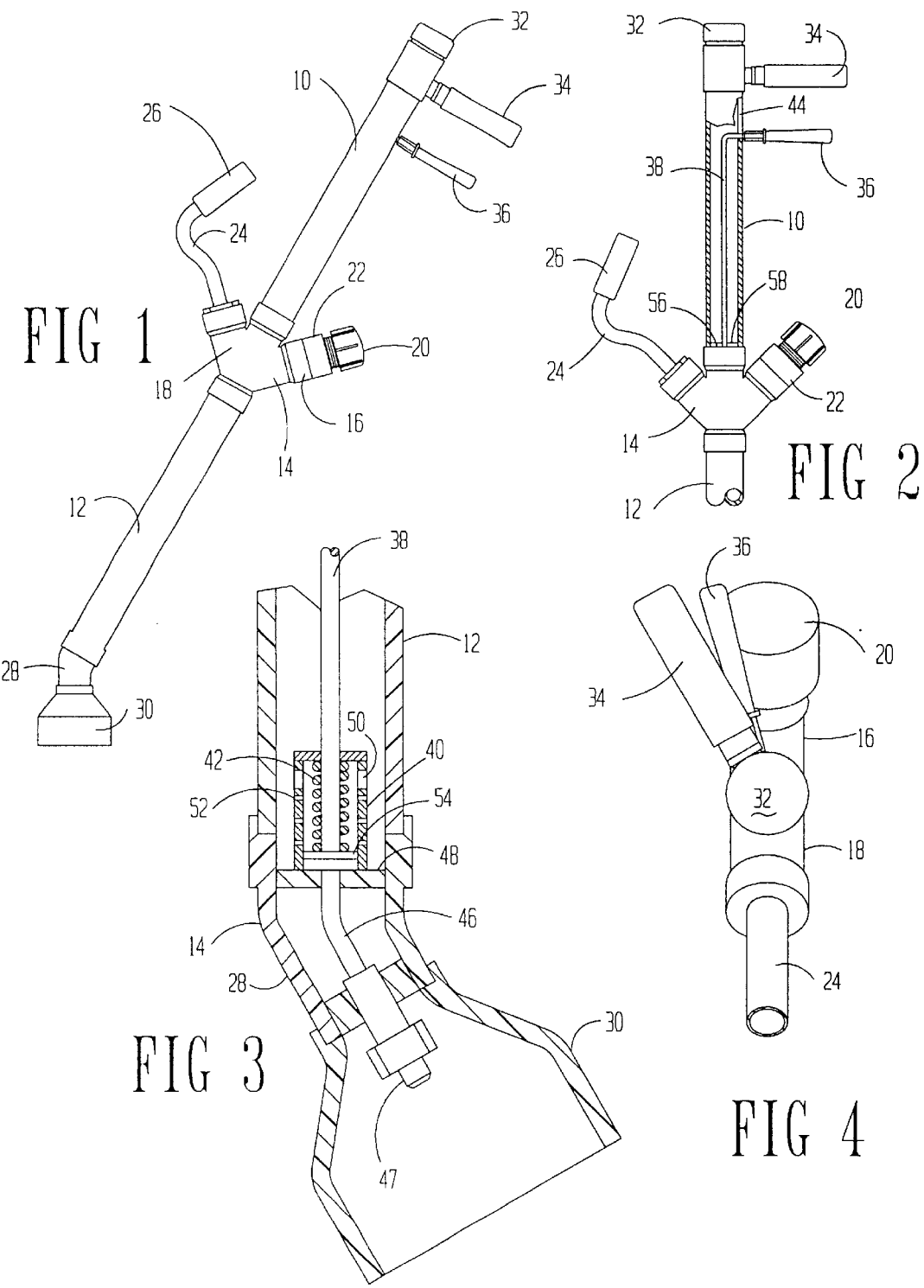

WEED STICK SPRAY

CROSS REFERENCE TO RELATED APPLICATION

Applicant filed Disclosure Document Number 453,700 on Mar. 25, 1999 which document concerns this application; therefore, by separate paper it is respectfully requested that the document be retained and acknowledgment thereof made by the Examiner. (MPEP 1706)

BACKGROUND OF THE INVENTION (1) Field of the Invention

This invention relates to the selective application of herbicides. People who apply herbicides have ordinary skill in this art.

(2) Description of the Related Art

As public awareness of the dangers and risks associated with broadcast application of herbicides increases, the public has become increasingly interested in herbicide application methods that reduce the overall amount of chemical released into the environment.

Most of the related art patents in this field were issued in the late 1950's. Eg. DICKSON 2,841,923. While many of these inventions may have been conceptually viable before they were marketable, most also have the inherent characteristic that the amount or volume of herbicide applied to the particular plant within the spray shield was dependent upon a uniform application of force and duration by the operator of the device. That is, an operator using these related art devices could inadvertently not apply the correct amount herbicide in any situation by either not forcing a displacement handle down with enough force or the proper distance.

SUMMARY OF THE INVENTION (1) Progressive Contribution to the Art

This invention, although facially similar to the related art devices, involves an innovative structure and related method of triggering the application of herbicide to a particular plant.

(2) Objects of this Invention

An object of this invention is to apply an effective amount of herbicide to a small controlled space.

Another object of this invention is to provide a light weight applicator which does not require the person using it to bend over to apply the herbicide to a specific plant.

Further objects are to achieve the above with devices that are sturdy, compact, durable, lightweight, simple, safe, efficient, versatile, ecologically compatible, energy conserving, and reliable, yet inexpensive and easy to manufacture, operate, and maintain.

Other objects are to achieve the above with a method that is rapid, versatile, ecologically compatible, energy conserving, efficient, and inexpensive, and does not require highly skilled people to operate, and maintain.

Further objects are to achieve the above with a product that is easy to store, has a long storage life, is safe, versatile, efficient, stable and reliable, yet is inexpensive and easy to manufacture and operate.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a side elevation view of an embodiment of the invention.

FIG. 2 is an axial partial sectional view of the upper portion of the invention.

FIG. 3 is an axial sectional view of the lower portion of the invention to a large scale.

FIG. 4 is a top plan view of the invention.

CATALOGUE OF ELEMENTS

As an aid to correlating the terms of the claims to the exemplary drawing(s), the following catalog of elements and steps is provided:

| | |
|---|---|
| 10 | top tube |
| 12 | chemical tube |
| 14 | branch fitting |
| 16 | cap branch |
| 18 | hand hold branch |
| 20 | cap |
| 22 | cuff |
| 24 | handle extension rod |
| 26 | rubber hand grip |
| 28 | bend |
| 30 | bell |
| 32 | top cap |
| 34 | hand hold |
| 36 | lever |
| 38 | rod |
| 40 | cylinder |
| 42 | spring |
| 44 | slot |
| 46 | tube |
| 47 | nozzle |
| 48 | platform |
| 50 | large hole |
| 52 | little holes |
| 54 | piston |
| 56 | barrier |
| 58 | seal |

DESCRIPTION OF THE PREFERRED EMBODIMENTS(S)

Referring to the drawings, particularly FIG. 1, it may be seen that one embodiment of this invention uses standard plastic pipe or tubing with different fittings as the applicator.

As may be seen, top tube 10 is connected to chemical tube 12. These tubes are connected together with a special branch fitting 14. The branch fitting 14 has cap branch 16 and handle hand hold branch 18. The cap branch has screw cap 20 which mates with threads on cuff 22 so that the cap may be removed and herbicide poured therein to fill the chemical tube 12.

The hand hold branch 18 has a hand extension 24 securely fixed thereto. Rubber hand grip 26 telescopes over the end of extension 24. Upper tube is fitted to branch fitting 14 coaxial with the chemical tube 12.

At the bottom of the chemical tube 12, bend 28 is attached. Bell 30 is attached to the end of the bend 28. The axis of the bell 30 is about a 30o angle to the axis of tubes 10 and 12.

The top of the tube is closed with permanent cap as top cap 32. Rubber covered hand hold 34 extends radially from the top cap 32. FIG.4 and FIG. 1 show the relationship between the hand grip 26 and hand hold 34 so that the applicator maybe conveniently carried by the user. The main support will be with the hand grip 26. The hand hold 34 functions to steady the applicator and also to form as a hold when lever 36 is used to lift rod 38. FIG. 4 shows that the handle and the grip are not in a 180° relationship but are spaced other wise making it more convenient to be used. Normally the left hand holds the grip 26.

The right hand normally is on the hand hold 34 and the right hand operates the lever 36.

The rod 38 extends from the lever 36 near the top of the upper tube 10 to cylinder 40 at the bottom of the chemical tube 12. Spring 42 in the cylinder 40 will normally hold the rod 38 in a lower position. Slot 44 limits the travel of the lever. The lever 36 is located within the slot 44. The slot is aligned with the axis of the tubes and extends from the lower position of the lever to the upper position of the lever.

Spray nozzle 47 is aligned with the axis of the bell 30 at about the junction of the bell and the bend. The spray nozzle 47 is connected by tube 46 through an opening in platform 48. Platform 48 is at the approximate bend of the element bend 28. The platform is at right angles to the axis of the tubes 10 and 12. The cylinder 40 is sealed to the top of the platform 48. The tube 46 extends through and is attached to a circular opening in the platform. The platform 48 thereby both supports the tube 46 but also provides a fluid connection through it so that the tube 46 is in fluid connection with the open bottom of the cylinder 40. The cylinder 40 includes large holes 50 at the upper portion of it and several little holes 52 near the bottom of the cylinder.

In operation the applicator would be carried to a place for a weed to be treated with herbicide. The 30 degree angle permits the bell 30 to surround the weed and be placed firmly on the earth while the tube is in a convenient angle to be held by the operator. With the bell in position the operator with one hand on the hand hold 34 will reach for the lever 36 and pull it upwards. As the lever and rod 38 move upward a piston 54 on the bottom of the rod will move upward. The element referred to as piston 54 might well be a thin rigid element which makes a reasonable sealed sliding contact with the inside surface of the cylinder 40. As it moves up the space below the pistons 54 in the cylinder 40 will be supplied with herbicide through the little holes 52. The big holes 50 at top allow the herbicide to flow outward and thus do not impede upper travel of the piston.

It will also be understood that the spring 42 is compressed as the piston moves up. With the spring thus compressed the operator releases the lever. The spring 42 forces the piston down rapidly. The rapid movement of the piston downward will increase the pressure of the herbicide below the piston. The pressurized herbicide will be released partly through the tube 46 and the nozzle 47 and partly through the little holes 52. Although a portion of the herbicide will flow through the little holes, the holes 52 are sufficiently small and do not prevent a major flow through the spray nozzle 47 to spray a desired amount of herbicide upon the weed surrounded by the bell.

There is no check valve in the bottom of the cylinder nor in the tube. If a vacuum develops within the chemical tube 12, that air may flow upward through the nozzle 47 and into the chemical chamber 12. However this will only serve to release the vacuum therein. Also the cap 20 would eventually relieve the pressure for although the threads of the cap would normally prevent the flow of herbicide outward that they would not prevent a slow movement of air in or out.

Barrier 56 is located in the bottom of the upper tube 10. It a circular hole there through to accommodate the rod 38. Seal in the barrier 56 restricts if not prevent, the leakage of herbicide into the upper chamber 10 in the event that the applicator is laid flat upon the ground.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to point out the advantages and the progressive contribution to the art of applying herbicides and to enable one skilled in the art to make and use the invention. The limits of the invention and the bounds of the patent protection are measured by and defined in the following claims.

I claim as my invention:

1. The structure of a chemical application device comprising:
    a) a hollow tube having an upper and lower end,
    b) a removable cap on a branch on the tube,
    c) a spray shield on the lower end of the tube,
wherein the improvement comprises:
    d) a spray nozzle in an upper portion of the spray shields
    e) a cylinder within the tube at the lower end thereof,
    f) the nozzle in fluid communication with the cylinder,
    g) a piston within the cylinder,
    h) a spring biasing the piston toward said nozzle,
    i) a rod connected to said piston and extending upward within the tube,
    j) a lever extending through
    k) a slot in the upper portion of the tube,
    l) the lever attached to the rod,
    m) a top hand hold on the tube extending radially outward above the lever, and
    n) a middle hand grip on the tube extending radially outward below the lever and opposed the top hand hold and lever.

2. The structure of a chemical application device comprising:
    a) a hollow tube having an upper and lower end,
    b) a removable cap on a branch on the tube,
    c) a spray shield on the lower end of the tube,
wherein the improvement comprises:
    d) a spray nozzle in an upper portion of the spray shield,
    e) a cylinder within the tube at the lower end thereof,
    f) the nozzle in fluid communication with the cylinder,
    g) a piston within the cylinder,
    h) a spring biasing the piston toward said nozzle,
    i) a rod connected to said piston and extending upward within the tube,
    j) a lever extending through
    k) a slot in the upper portion of the tube,
    l) the lever attached to the rod,
    m) small holes in a bottom of the cylinder, and
    n) large holes in the top of the cylinder to permit proper operation of the cylinder and piston as a pump.

3. The structure of a chemical application device comprising:
    a) a hollow tube having an upper and lower end,
    b) a removable cap on a branch on the tube,
    c) a spray shield on the lower end of the tube, wherein the improvement comprises:
  d) a spray nozzle in an upper portion of the spray shield,
  e) a cylinder within the tube at the lower end thereof,
  f) the nozzle in fluid communication with the cylinder,
  g) a piston within the cylinder,
  h) a spring biasing the piston toward said nozzle,
  i) a rod connected to said piston and extending upward within the tube,
  j) a lever extending through
  k) a slot in the upper portion of the tube,
  l) the lever attached to the rod,
  m) a barrier in the tube above said cap,
  n) said rod extending through a seal in said barrier,
  o) small holes in a bottom of the cylinder,
  p) large holes in the top of the cylinder to permit proper operation of the cylinder and piston as a pump,
  q) a top hand hold on the tube extending radially outward above the lever, and
  r) a middle hand grip on the tube extending radially outward below the lever and opposed the top hand hold and lever.

* * * * *